United States Patent
Pozzobon

[19]

[11] Patent Number: 5,806,211
[45] Date of Patent: Sep. 15, 1998

[54] METHOD FOR MANUFACTURING A SHOE

[75] Inventor: Alessandro Pozzobon, Paderno Di Ponzano Veneto, Italy

[73] Assignee: Nordica S.p.A., Trevignano, Italy

[21] Appl. No.: 769,175

[22] Filed: Dec. 18, 1996

[30] Foreign Application Priority Data

Dec. 27, 1995 [IT] Italy .................................. TV95A0166

[51] Int. Cl.⁶ .............................. A43B 5/04; A43D 25/20
[52] U.S. Cl. ........................ 36/115; 12/147 T; 12/142 RS
[58] Field of Search ............................. 36/115; 12/142 T, 12/142 P, 142 RS, 145, 146 B

[56] References Cited

U.S. PATENT DOCUMENTS

| | | | |
|---|---|---|---|
| 3,812,604 | 5/1974 | Sato | 12/142 RS |
| 4,351,537 | 9/1982 | Seidel | 36/115 |
| 4,453,727 | 6/1984 | Bourque | 36/115 |
| 4,662,018 | 5/1987 | Autry | 12/142 RS |
| 4,706,316 | 11/1987 | Tanzi | 12/142 T |
| 4,910,889 | 3/1990 | Bonaventure et al. | 12/142 P |
| 5,171,033 | 12/1992 | Olson et al. | 36/115 |
| 5,437,466 | 8/1995 | Meibock et al. | 36/115 |

*Primary Examiner*—Paul T. Sewell
*Assistant Examiner*—Anthony Stashick
*Attorney, Agent, or Firm*—Guido Modiano; Albert Josif

[57] ABSTRACT

A method for manufacturing a shoe, particularly for skates, entails the positioning of a soft innerboot on an adapted last and the subsequent dry assembly of a rigid shell made of plastics to the innerboot. An overlap injection-molding or pouring of thermoplastic or thermosetting material is then performed on at least part of the edge of the shell so as to affect the innerboot and the frame, in order to achieve a skate that simultaneously provides comfort for the user's foot and optimum transmission of forces at the underlying supporting frame for the wheels that are associated below the shell.

17 Claims, 4 Drawing Sheets

METHOD FOR MANUFACTURING A SHOE

BACKGROUND OF THE INVENTION

The present invention relates to a method for manufacturing a shoe, particularly for skates, and to a shoe obtained with said method.

Conventional skates are constituted by a cuff rotably associated with a shell, both made of plastics. A soft innerboot is arranged inside the shell and the cuff and a pivoting frame for the wheels, arranged for example in an in-line fashion, is associated with the shell.

The method for manufacturing these products substantially entails molding the shell and the quarter, connecting them, and then inserting the soft innerboot inside them.

DE-3,043,425 discloses a skate which is substantially composed of three separate bodies: a frame adapted to support wheels or an ice-skating blade, a soft innerboot and a rigid insole.

The insole is provided, in the lower part, with adapted pins which, once associated with the innerboot and with the frame, allow the rigid interconnection of the three components of the skate.

The use of this conventional method to fix the innerboot to the frame necessarily requires the presence of a rigid structure, constituted by the insole, inside the innerboot, and this component makes direct contact with the foot.

This hinders the user's comfort as well as the stability of the foot inside the innerboot.

It has in fact been noted that the rigid insole must be formed according to a standard foot shape and therefore cannot optimally adapt to the specific shape of each individual user.

It is also noted that due to the stresses applied during sports practice, the pins are subject to deformations that alter the connection to the other two bodies that compose the skate.

Accordingly, a decrease occurs in the control sensitivity of skate on the part of the user, in the stability of the skate itself, and ultimately also in the safety of the skater.

CA-2,071,806 discloses a shoe for a skate with in-line wheels, comprising a shell that only partially surrounds part of the soft innerboot.

The shape of the shell is such as to substantially have lateral containment regions at the toe and heel of the innerboot and only to a very limited extent on the sides of the foot; this solution allows to extract the soft innerboot while the foot is still inserted therein and is indeed allowed by the limited containment of the innerboot in the middle lateral region.

However, this solution entails drawbacks: the shell thus shaped in fact does not ensure securing of the soft innerboot to the shell, because of the limited number of securing points.

The innerboot can thus move inside the shell and tends to move both longitudinally to the skate and transversely thereto.

These relative movements cannot be compensated by tightening the levers further; therefore, there is a real possibility that the innerboot might slip out of the shell during skating, with conceivable severe consequences for the user.

The relative movements of the soft innerboot inside the shell in any case entail further disadvantages, such as less control and maneuverability of the sports implement, worsened as regards the insufficient lateral containment provided by the shell when the skater performs lateral thrusts to increase his speed or when the brakes with the method known as "side-slip", which entails placing the skate in a direction that is approximately perpendicular to the direction of travel.

CA-2,101,718, filed by Canstar Sports Group Inc., discloses a partial solution to these drawbacks; the patent relates to a skate with in-line wheels the frame whereof is associated to a shell partially surrounding a soft innerboot, said shell having a front toe cup, which partially surrounds the toe of the shoe, and perimetric guiding seats for a first strap that surrounds the upper part of the foot, compressing it, and for a second strap that surrounds the foot instep.

Although these straps allow to retain the innerboot in the shell, preventing its escape, they do not fully eliminate the problem of the relative movements between the two components. Furthermore, the effect of the straps is that the foot is compressed against the bottom of the shell, without being able to make the innerboot optimally adhere laterally to the shell.

During sports practice, the stresses acting on the shell are countless and have different characteristics; accordingly, the user is forced to tighten the strap considerably, but excessively tight closure causes discomfort to the user's foot, such as painful regions where the strap applies its pressure or difficult blood circulation in the foot, because of excessive pressure on the foot.

The only remedy is to avoid tightening the straps too much, but in this case the problem of not having good securing of the innerboot to the shell remains.

WO-95/03101 discloses a shoe for a skate with in-line wheels comprising a shell that only partially surrounds a soft innerboot, which is fixed to the shell by gluing.

A quarter is articulated to the shell and has flaps that surround the tibial region and secure the innerboot by means of an appropriate lever; the shell is laterally provided with two seats for guiding a strap that affects the foot instep region.

This solution, however, also entails drawbacks, such as the industrialization of the step for gluing the innerboot, which is very difficult because of the shapes of the shells to which the innerboot must be glued.

Furthermore, gluing entails imperfect finishing due to the possible presence of smears and smudges of glue on the innerboot along the perimeter of the shell, thus worsening its aesthetic appearance. Furthermore, in the case of production rejects, both the innerboot and the shell cannot be recovered.

Finally, during sports practice the foot tends to move inside the innerboot due to the applied forces; the continuous actions of compression and traction forces entail the gradual separation of the innerboot from the shell, thus causing the innerboot to perform unwanted movements, with a gradual decrease in skate control.

SUMMARY OF THE INVENTION

A principal aim of the present invention is therefore to solve the above problems, eliminating the drawbacks of the mentioned prior art by providing a method that allows to obtain a soft innerboot that is associable with a rigid shell and, once associated therewith, is free from possible relative movements inside the shell, allowing optimum transmission of forces to a supporting frame for the wheels or to a blade.

Within the scope of this aim, an important object is to provide a shoe that allows optimum control and maneuverability of the skate and good lateral containment on the part of the shell, both during skating and during braking with the so-called "side-slip" method.

Another object is to provide a shoe for a skate in which it is possible to combine the characteristics of the soft parts, substantially constituted by the innerboot, with those of the rigid parts, constituted by the shell, so as to minimize the rigid structural parts while maintaining a high level of technical performance and comfort.

Another important object is to provide a method that allows to obtain a skate that ensures not only optimum transmission of lateral forces from the innerboot to the shell but also optimum comfort for the skater's foot, preventing compression of the foot as caused by the prior art.

Another object is to provide a method and a shoe that achieve the above characteristics and also allow to avoid the application of localized forces at the metatarsal region or foot instep region and/or compression of the foot against the lower surface of the shell.

Another important object is to provide a method that allows more effective industrialization.

Another object is to provide a shoe the structure whereof allows to obtain a better overall aesthetic appearance.

This aim, these objects, and others that will become apparent hereinafter are achieved by a method for manufacturing a shoe that comprises a frame, a rigid shell and a soft innerboot, characterized in that it comprises the following steps:

a) positioning said soft innerboot on an adapted last;

b) dry assembly of said shell on said innerboot;

c) overlap injection-molding or pouring of thermoplastic or thermosetting material on at least part of an edge of said shell so as to affect said innerboot and the frame.

Moreover a shoe, particularly for a skate, is provided, characterized in that it comprises a soft innerboot with which a rigid shell is associated, said shell having at least one ridge for connection to said innerboot and to said frame.

BRIEF DESCRIPTION OF THE DRAWINGS

Further characteristics and advantages of the invention will become apparent from the detailed description of some particular but not exclusive embodiments thereof, illustrated only by way of non-limitative example in the accompanying drawings, wherein.

DESCRIPTION OF THE PREFERRED EMBODIMENTS

Figure 1:
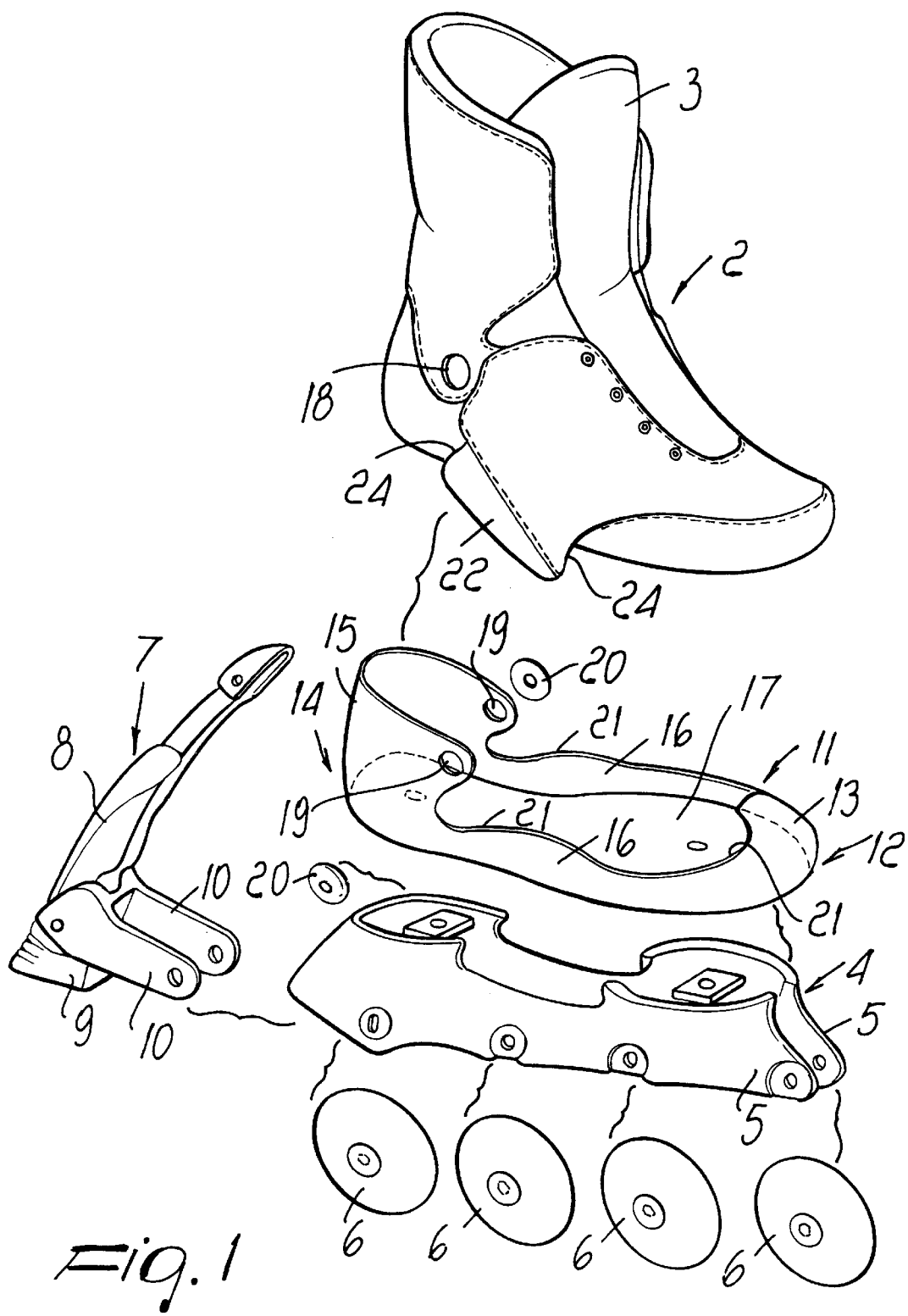
FIG. 1 is an exploded view of the components of the shoe according to the invention, associated to a skate.
Figure 2:
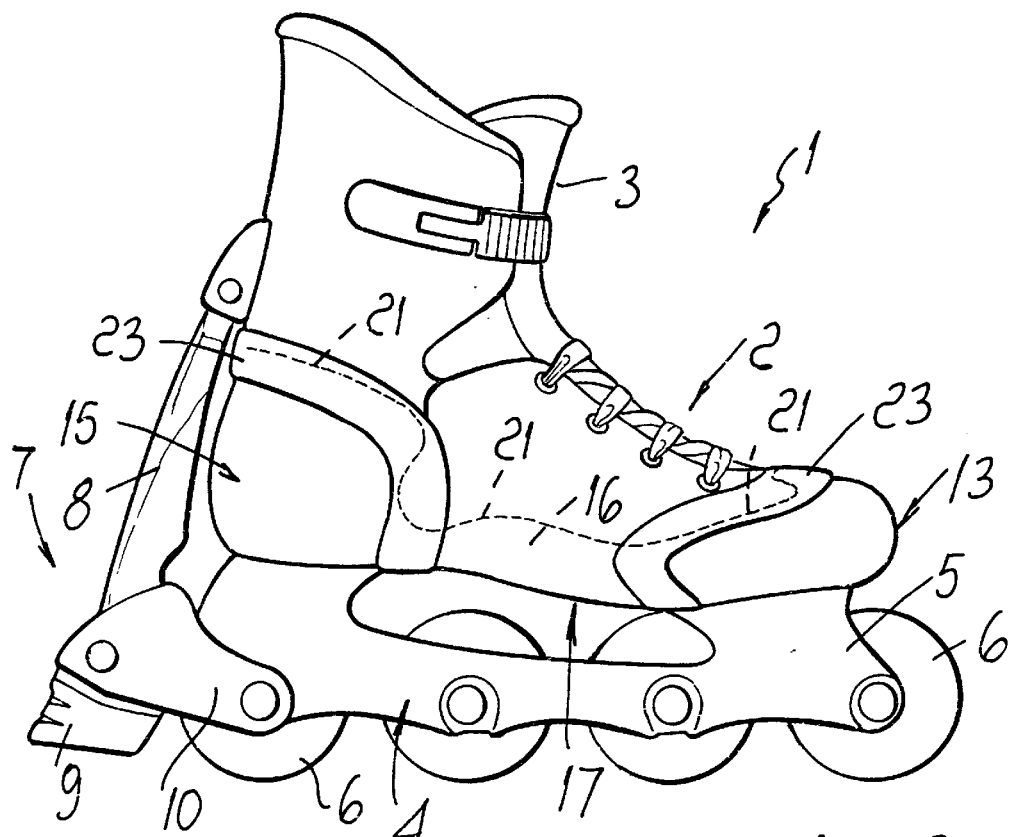
FIG. 2 is a side view of the shoe associated to a skate.

With reference to the above figures, the reference numeral 1 designates a skate associated to a soft innerboot 2, preferably of the type having a front opening at which a tongue 3 is arranged.

The skate is constituted by a substantially U-shaped frame 4, between whose wings 5 a plurality of wheels 6 are freely rotatably pivoted and are mutually aligned.

A conventional braking device 7 is associated in the rear part of the frame 4 and is constituted for example by a rod 8 that is associated, at one end, with the rear of the innerboot 2 and has, at the other end, a pad 9 that interacts with the ground. Rod 8 has arms 10 that are articulated at one end at the same axis as the last rear wheel 6.

The skate is constituted by a rigid shell 11 for partially containing said innerboot 2; the shell has a toe cup 13 at the toe region 12 and a heel containment cup 15 at the heel region 14.

The toe cup 13 and the heel cup 15 are interconnected by means of side walls 16 that protrude perimetrically with respect to the sole 17 and are adapted to partially contain the lower part of the innerboot 2.

The sole 17 is connected to the underlying frame 4 by conventional systems.

Approximately at the malleolar region, the innerboot 2 and the shell 11 have adapted first holes 18 and second holes 19 for mutual articulation by means of rivets or studs 20.

An optional rigid cuff, not shown in the accompanying drawings, can be rotatably connected to the shell 11.

The method for manufacturing the skate 1 includes, optionally in different sequences, the following steps: a first step in which the soft innerboot 2 is positioned on an adapted last, followed by dry assembly of the shell 11 on said innerboot 2.

The innerboot and the shell are interconnected by means of a successive overlap injection-molding or pouring of thermoplastic or thermosetting material at at least part of the edge 21 of the shell 11 and therefore of the edge of the toe cup 13, of the heel cup 15, and of the side walls 16, thus obtaining a ridge 23 that is approximately annular and is preferably closed.

Figure 3:
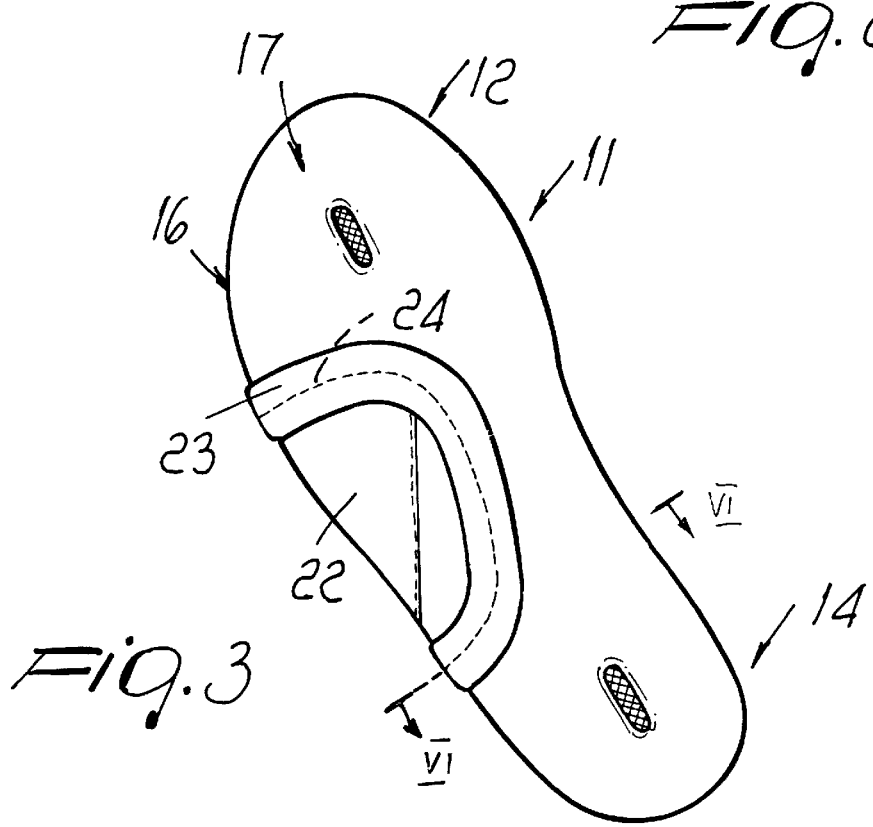
FIG. 3 is a bottom view of the shell, with the innerboot associated therewith.

In the particular illustrated embodiment, at the outer side of the foot, the soft innerboot 2 has a tab 22 that can be arranged outside the side wall 16 and can be partially folded at the sole 17 of the shell 11, as shown in FIG. 3.

In the particular solution shown in the drawings, the coupling between the innerboot and the shell occurs by overlap injection-molding or pouring of thermoplastic material so as to form a ridge 23 that affects the entire edge of the hell cup 15, then affects the lateral edge 24 of the tab 22, then passes below the shell 11 so as to affect the sole 17, blending with the edge 21 of the toe cup 13, and then affects the edge 21 of the other side wall 16 of said shell 11 so as to achieve a closed-loop shape.

It has thus been observed that the method and the product obtained thereby have achieved the intended aim and objects, since the method allows to provide a shoe that is constituted by a soft innerboot that can be associated with a rigid shell so as to prevent any relative movements inside said shell, at the same time allowing optimum transmission of forces to the wheel supporting frame or to a blade.

A skate structure is thus obtained that allows optimum control and maneuverability and good lateral containment both during skating and during braking according to the so-called "side-slip" method.

The ridge 23 can also be used as a protective, shock-proof, and abrasion-resistant element for the skate.

The method allows to obtain a skate that provides optimum comfort for the skater's foot, preventing its compression.

The method and the shoe according to the invention are susceptible of numerous modifications and variations within the scope of the appended claims.

Figure 4:
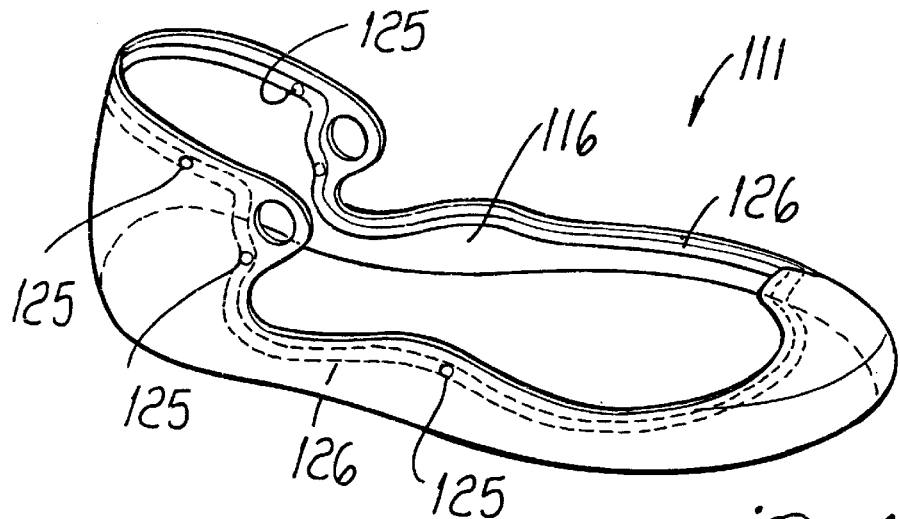
FIG. 4 is a lateral perspective view of the shell in a further embodiment.
Figure 5:
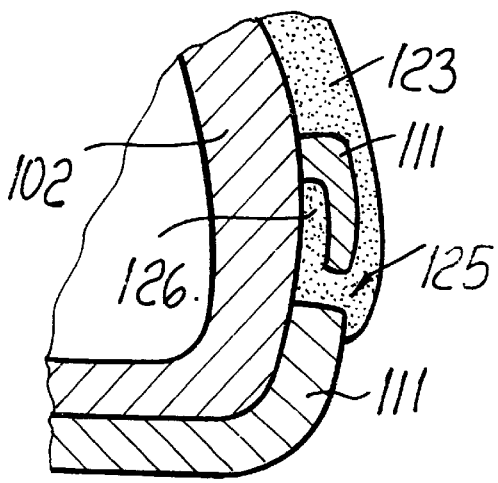
FIG. 5 is a sectional view of a detail of the innerboot, illustrating the connection between the innerboot and the shell.

Thus, for example, FIGS. 4 and 5 illustrate a different embodiment regarding the manufacturing of the shell 111. At the regions affected by the overlap injection-molding mentioned earlier, the shell has adapted openings 125 that pass through the thickness of the shell 111 and are advantageously connected to adapted channels 126 adapted to facilitate and orientate the flow of the thermoplastic or thermosetting material that constitutes the ridge 123.

In this manner, said overlap injection-molding or pouring follows, as regards the flow of the plastic material, a preferential and controlled path that is adapted to ensure perfect adhesion between the shell and the innerboot 102.

The channels 126 can be provided for example preferably at the regions that are stressed most intensely during sports practice.

The openings 125 and the channels 126 therefore allow to form regions of greater or lower adhesion, varying the dimensions and/or the positioning of the openings of said channels.

Furthermore, the thickness of thermoplastic material that forms internally between the shell and the innerboot does not decrease the fit of said innerboot and does not produce uncontrollable localized pressure points, thanks to the presence and extrinsic shape of the channels that form a sort of containment chamber for the thermoplastic material.

Figure 6:
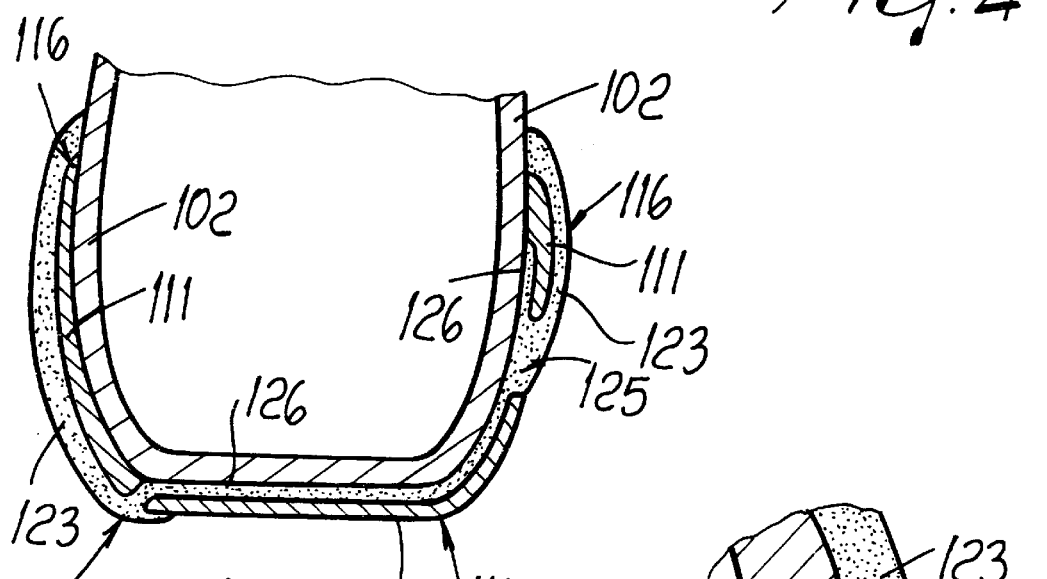
FIG. 6 is a sectional view of a further embodiment of the shoe, taken along the plane VI—VI of FIG. 3.

In the particular solution shown in FIG. 6, an opening 125 and a channel 126 are formed at the sole 117 of the shell 111; this causes the mutual adhesion not only of the side walls 116 but also of one or more regions for resting the sole of the foot.

The external appearance of the skate is much more pleasant than conventional skates, since the rigid components contained therein are not present thanks to the limited size of the shell.

The use of the tab 22, shown in the previous figure, allows to conceal the shell; this can also be achieved by varying the thickness and/or height of the ridge 23.

Figure 7:
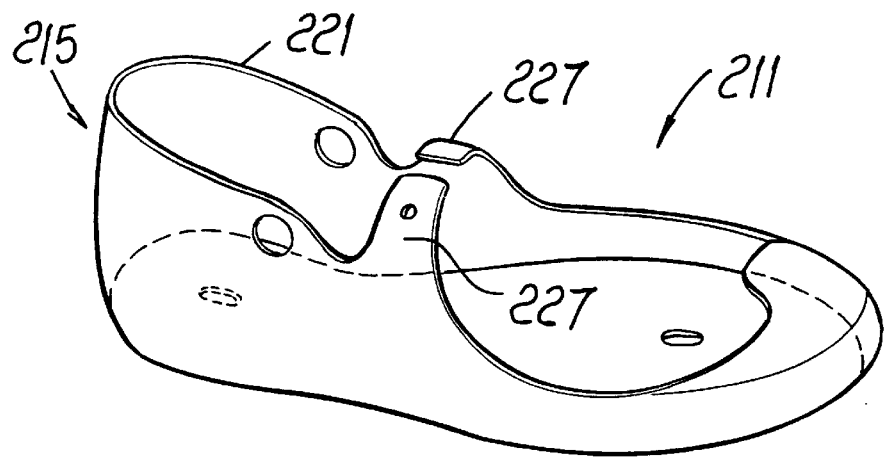
FIG. 7 is a lateral perspective view of a shell in a further embodiment.
Figure 8:
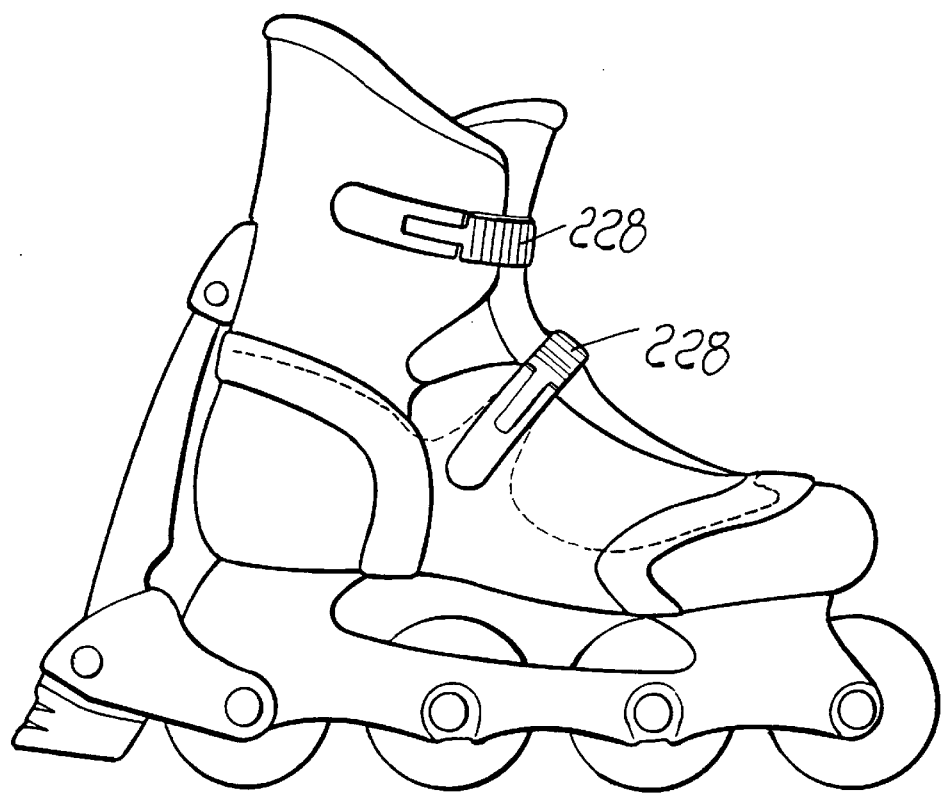
FIG. 8 is a side view of still a further embodiment of the shoe.

FIGS. 7 and 8 illustrate a further embodiment for a shell 211 which, differently from the previous one where laces are used to close the foot instep region, has at least one pair of straps 227 protruding from the perimetric region 221 in a region that is adjacent to the heel cup 215; said straps, which are thus arranged approximately transversely to the shell, support a conventional lever fastening device 228.

A lever fastening device can also be used in a shoe comprising a shell of the type designated by the reference numeral 11; in this case it is necessary to provide, at the fixing points of the device, adapted rigid plates inserted in the innerboot 2.

The materials and the dimensions that constitute the individual components of the skate may of course be the most pertinent according to the specific requirements.

What is claimed is:

1. A method for manufacturing a shoe comprising the steps of:

providing a soft innerboot;
   providing a rigid shell having an opening and a perimetric edge about said opening and adapted for surrounding a lower part of said soft innerboot said shell having a sole, said shell also having a toe cup at a toe region and a heel containment cup at a heel region, said toe cup and said heel cup being connected with said sole and extending upwardly from said sole, and said perimetric edge of said shell extending at said toe cup and said heel cup;
   positioning said soft innerboot on a last;
   providing a dry assembly of said shell on said innerboot such that said shell surrounds the lower part of said soft innerboot and such that said toe cup of said shell surrounds and contains a toe portion of said innerboot and such that said heel cup surrounds and contains a heel portion of said innerboot; and
   placing a connecting material on at least part of said perimetric edge of said shell and on a portion of said innerboot so as to connect said innerboot and said shell by means of said connecting material and such that said connecting material comprises at least: a heel connecting portion which is arranged over a portion of said perimetric edge of said shell extending at said heel cup and which is arranged over a portion of said heel portion of said innerboot and which is arranged over a portion of said shell arranged adjacent said portion of said perimetric edge extending at said heel cup so as to interconnect said portion of said shell arranged adjacent said portion of said perimetric edge extending at said heel cup with said portion of said heel portion of said innerboot; and a toe connecting portion which is arranged over a portion of said perimetric edge of said shell extending at said toe cup and which is arranged over a portion of said toe portion of said innerboot and which is arranged over a portion of said shell arranged adjacent said portion of said perimetric edge extending at said toe cup so as to interconnect said portion of said shell arranged adjacent said portion of said perimetric edge extending at said toe cup with said portion of said toe portion of said innerboot.

2. The method of claim 1, wherein said step of providing said rigid shell comprises providing said rigid shell having side walls that protrude perimetrically with respect to said sole of said shell and which interconnect said toe cup and said heel cup of said shell.

3. The method of claim 2, wherein said step of placing said connecting material on at least part of said perimetric edge of said shell and on a portion of said innerboot comprises placing the connecting material at a portion of said perimetric edge extending at said side walls.

4. The method of claim 2, wherein said step of providing said soft innerboot comprises providing said soft innerboot having, at an outer foot side of the innerboot, a tab, and wherein said step of providing a dry assembly of said shell on said innerboot comprises arranging said tab outside an outer foot side wall of said side walls and folding said tab at said sole of said shell.

5. The method of claim 4, wherein said step of placing said connecting material on at least part of said perimetric edge of said shell and on a portion of said innerboot comprises forming the connecting material into a ridge that fully affects the edge of said heel cup, the lateral edge of said tab, and then passes below said shell so as to affect said sole and then blends with said edge of said toe cup and with the edge of an inner foot side wall of said side walls of said shell so as to obtain a closed-loop shape of said ridge.

6. The method of claim 1, wherein said step of providing said shell comprises providing said shell having openings extending between internal and external surfaces of said shell and wherein said step of placing a connecting material comprises filling said openings of said shell with said connecting material.

7. The method of claim 6, wherein said step of providing said shell comprises providing said shell with channels which are connected with said openings and that facilitate and orientate a flow of the connecting material.

8. The method of claim 7, comprising providing said channels formed through part of the thickness of said shell.

9. The method of claim 7, comprising providing one or more of said openings connected to one or more of said channels at the sole of said shell.

10. The method of claim 1, wherein said step of providing said shell comprises providing said shell having at least one pair of straps for supporting a lever fastening device such that said straps protrude from said edge and are arranged approximately transversely to said shell.

11. The method of claim 1, further comprising the step of connecting a skate frame to said innerboot, and wherein the step of providing said shell comprises providing said shell having at least one ridge for connection to said innerboot and to said frame.

12. The method of claim 1 wherein said step of placing said connecting material comprises injection-molding said connecting material.

13. The method of claim 12 wherein said step of placing said connecting material comprises injection-molding said connecting material in the form of thermoplastic connecting material.

14. The method of claim 12 wherein said step of placing said connecting material comprises injection-molding said connecting material in the form of thermosetting connecting material.

15. The method of claim 1 wherein said step of placing said connecting material comprises pouring said connecting material.

16. The method of claim 15 wherein said step of placing said connecting material comprises pouring said connecting material in the form of thermoplastic connecting material.

17. The method of claim 15 wherein said step of placing said connecting material comprises pouring said connecting material in the form of thermosetting connecting material.

* * * * *